(12) United States Patent
Doria et al.

(10) Patent No.: US 8,155,807 B2
(45) Date of Patent: Apr. 10, 2012

(54) FUSION FOR AUTOMATED TARGET RECOGNITION

(75) Inventors: David M. Doria, Lakewood, CA (US); Robert T. Frankot, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 624 days.

(21) Appl. No.: 12/398,116

(22) Filed: Mar. 4, 2009

(65) Prior Publication Data

US 2010/0226534 A1 Sep. 9, 2010

(51) Int. Cl.
G06F 19/00 (2011.01)
(52) U.S. Cl. .......................................... 701/17; 382/103
(58) Field of Classification Search ...................... 701/17
See application file for complete search history.

(56) References Cited

U.S. PATENT DOCUMENTS

| | | | | |
|---|---|---|---|---|
| 5,408,541 A * | 4/1995 | Sewell | | 382/291 |
| 6,487,519 B1 * | 11/2002 | O'Neill et al. | | 702/176 |
| 6,822,583 B2 * | 11/2004 | Yannone et al. | | 340/945 |
| 7,132,961 B2 * | 11/2006 | Yannone et al. | | 340/961 |
| 7,460,951 B2 * | 12/2008 | Altan et al. | | 701/207 |
| 7,522,091 B2 * | 4/2009 | Cong et al. | | 342/70 |
| 7,602,478 B2 * | 10/2009 | Root, Jr. | | 356/5.04 |
| 7,626,533 B2 * | 12/2009 | Cong et al. | | 342/70 |
| 2005/0110661 A1 * | 5/2005 | Yannone et al. | | 340/945 |
| 2005/0179580 A1 * | 8/2005 | Cong et al. | | 342/70 |
| 2005/0225477 A1 * | 10/2005 | Cong et al. | | 342/70 |
| 2007/0073473 A1 * | 3/2007 | Altan et al. | | 701/207 |
| 2010/0226534 A1 * | 9/2010 | Doria | | 382/103 |

* cited by examiner

*Primary Examiner* — Sath V Perungavoor
(74) *Attorney, Agent, or Firm* — Christie, Parker & Hale, LLP

(57) ABSTRACT

A method of predicting a target type in a set of target types from at least one image is provided. At least one image is obtained. A first and second set of confidence values and associated azimuth angles are determined for each target type in the set of target types from the at least one image. The first and second set of confidence values are fused for each of the azimuth angles to produce a fused curve for each target type in the set of target types. When multiple images are obtained, first and second set of possible detections are compiled corresponding to regions of interest in the multiple images. The possible detections are associated by regions of interest. The fused curves are produced for every region of interest. In the embodiments, the target type is predicted from the set of target types based on criteria concerning the fused curve.

26 Claims, 5 Drawing Sheets

FUSION FOR AUTOMATED TARGET RECOGNITION

BACKGROUND OF THE INVENTION

1. Field of the Invention

The present invention relates to fusion for automatic target recognition (ATR).

2. Description of Related Art

Various ATR systems have been designed to obtain accurate predictions from target recognition results based on imagery obtained by one or more sensors. Such systems generally attempt to predict a target type from a set of target types based on sensor data and/or fused data (e.g., data from multiple sensors and/or multiple looks).

To predict the target type from a set of target types, at least one image must be processed and data must be extracted. Depending on the system requirements and/or parameters, the data may include confidence values (e.g., a percentage, estimate or likelihood) and a corresponding pose for each of the confidence values.

These systems have utilized decision level, hypothesis level and feature level fusion in attempts to determine the best ATR evidence to be fused. Decision level fusion ATR systems determine the best ATR evidence over a range of azimuth angles for each look, but ignore consistency or relationship criteria between pose information. This and other fusion systems generally fuse ATR scores without regard to detailed pose information within the pose space uncertainty. Moreover, such systems fuse ATR scores after significant portions of the data is pruned by the individual ATR systems prior to fusion. These ATR systems may prune portions of the data for reasons of efficiency, or a specific ATR system may be unable to provide accurate predictive data without pruning the data. For example, the ATR system may be designed to combine specific portions of data, but not other portions of data, such that specific portions of data are required for that specific ATR system. The ATR system may also be designed such that data must be pruned prior to fusion if the data does not have sufficient information (e.g., points of data).

SUMMARY OF THE INVENTION

Exemplary embodiments according to the present invention provide a method and system of fusion for ATR. The method and system thereof reduce ambiguity of ATR hypotheses when performing fusion by utilizing information from sensor(s) to provide constraints on relative orientations. Significant improvement of ATR fusion results is achieved from the reduced ambiguity. The method may be implemented in single sensor, multiple ATR systems, multiple sensor, single look systems, and single sensor, multiple look systems.

According to an exemplary embodiment of the present invention, there is presented a method of predicting a target type in a set of target types from multiple images, wherein the method obtains a first image, obtains a second image, compiles a first set of possible detections corresponding to regions of interest within the first image, compiles a second set of possible detections corresponding to regions of interest within the second image, associates each of the regions of interest from the first set of possible detections with a corresponding one of the regions of interest from the second set of possible detections, determines a first set of confidence values and associated azimuth angles for each target type in the set of target types from the first image, determines a second set of confidence values and associated azimuth angles for each target type in the set of target types from the second image, fuses the first set of confidence values and the second set of confidence values in accordance with the associated regions of interest for each of the azimuth angles to produce a fused curve for each target type in the set of target types, each point in the fused curve being derived from one of the first set of confidence values and a corresponding one of the second set of confidence values for each azimuth angle, and predicts the target type from the set of target types based on at least one of a maximum value of the fused curve, a maximum area under the fused curve and a maximum area under the fused curve within an azimuth angle window.

The method may further normalize each of the first set of confidence values by subtracting a mean value of the first set of confidence values from each of the first set of confidence values and dividing the result by a standard deviation of the first set of confidence values, and normalize each of the second set of confidence values by subtracting a mean value of the second set of confidence values from each of the second set of confidence values and dividing the result by a standard deviation of the second set of confidence values.

The method may further align the first set of confidence values with the second set of confidence values for each target type in the set of target types by adding an angular offset to each of the azimuth angles associated with the first set of confidence values in proportion to a relative offset within the azimuth angles associated with the first set of confidence values and the azimuth angles associated with the second set of confidence values.

The target type may be further predicted by determining an area under the fused curve for each of a number of azimuth angle windows and for each target type in the set of target types, determining a maximum area under the fused curve from among the areas corresponding to each of the azimuth angle windows for each target type in the set of target types, and comparing each of the maximum areas to determine an absolute maximum area, the target type with the absolute maximum area being the predicted target type.

According to another exemplary embodiment of the present invention, there is presented a method of predicting a target type in a set of target types from an image, wherein the method obtains the image, determines a first set of confidence values and associated azimuth angles for each target type in the set of target types from the image, determines a second set of confidence values and associated azimuth angles for each target type in the set of target types from the image, fuses the first set of confidence values and the second set of confidence values for each of the azimuth angles to produce a fused curve for each target type in the set of target types, each point in the fused curve being derived from one of the first set of confidence values and a corresponding one of the second set of confidence values for each azimuth angle, and predicts the target type from the set of target types based on at least one of a maximum value of the fused curve, a maximum area under the fused curve and a maximum value of the fused curve between an azimuth angle window.

According to another exemplary embodiment of the present invention, there is presented an automatic target recognition fusion system, wherein the system includes at least one sensor configured to obtain images of a scene, at least one fusion processor configured to compile a first set of possible detections corresponding to regions of interest within a first image, compile a second set of possible detections corresponding to regions of interest within a second image, and associate each one of the regions of interest from the first set of possible detections with a corresponding one of the regions of interest from the second set of possible detections, and at least one automatic target recognition processor configured to determine a first set of confidence values and associated azimuth angles for each target type in a set of target types from the first image and determine a second set of confidence values and associated azimuth angles for each target type in the set of target types from the second image, wherein the fusion processor is further configured to fuse the first set of confidence values and the second set of confidence values in accordance with the associated regions of interest for each of the azimuth angles to produce a fused curve for each target type in the set of target types, each point in the fused curve being derived from one of the first set of confidence values and a corresponding one of the second set of confidence values for each azimuth angle, and predict the target type from the set of target types based on at least one of a a maximum value of the fused curve, a maximum area under the fused curve and a maximum area under the fused curve between an azimuth angle window.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

Accordingly, there is presented a method and system of fusion for ATR. The method and system thereof reduce ambiguity of ATR hypotheses when performing fusion by utilizing information from sensor(s) to provide a constraint on relative orientations. Significant improvement of ATR fusion results is achieved from the reduced ambiguity. The method may be implemented in single sensor, multiple ATR systems, multiple sensor, single look systems, and single sensor, multiple look systems.

Figure 1:
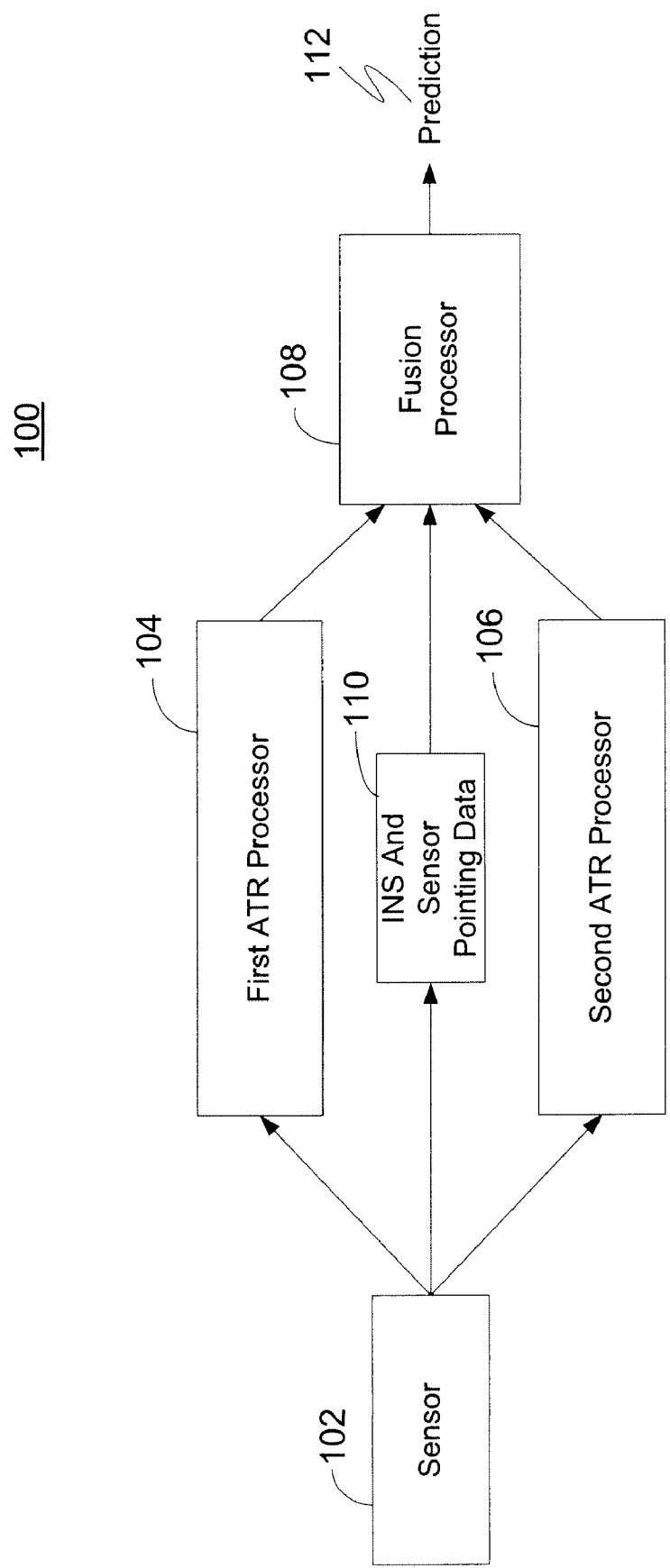
FIG. 1 is a block diagram illustrating an automatic target recognition fusion system utilizing a single sensor in accordance with an embodiment of the present invention.

FIG. 1 is a block diagram illustrating an automatic target recognition fusion system utilizing a single sensor in accordance with an embodiment of the present invention.

Referring now to FIG. 1, an ATR system 100 includes a sensor 102, a first ATR processor 104, a second ATR processor 106, and a fusion processor 108. Also depicted in FIG. 1 is INS (Inertial Navigation System) and sensor pointing data 110 and a prediction 112 (e.g., the predictive output of the system).

The sensor 102 is configured to receive radiation from a scene and relay optically processed radiation in the form of a signal to the first ATR processor 104 and the second ATR processor 106. One of ordinary skill in the art would recognize that the sensor 102 may be of various types, designed with specific materials and components based on the system's requirements. In an embodiment, the materials and components of the sensor 102 may be sensitive to radio frequency (RF) bands of the spectrum, but is not necessarily limited thereto. In other embodiments, the sensor 102 is sensitive to the visible spectrum, or any other band suitable to receive sensor information. By way of example, the sensor types comprise radar, infrared (IR), forward looking infrared (FLIR), laser radar (LADAR), and others.

The first ATR processor 104 and the second ATR processor 106 are each configured to process and generate ATR scores based on various ATR models (e.g., ATR algorithm) implemented in the processors and other components of the ATR system 100. An article by L. M. Novak, G. J. Owirka & W. S. Brower, entitled "An Efficient Multi-Target SAR ATR Algorithm," Conference Record of the Thirty-Second Asilomar Conference on Signals, Systems and Computers (1988, pp. 3-13, Vol. 1, Institute of Electrical and Electronics Engineers), hereby incorporated by reference in its entirety, describes examples of ATR models that may be utilized in the ATR system 100. The first ATR processor 104 implements a different ATR model than the second ATR processor 106 such that the fusion of the ATR scores from the ATR processors 104, 106 provides fused scores with greater constraints. In other embodiments, the different ATR models are implemented in a single ATR processor and output distinct ATR scores based on the different ATR models.

Figure 3:
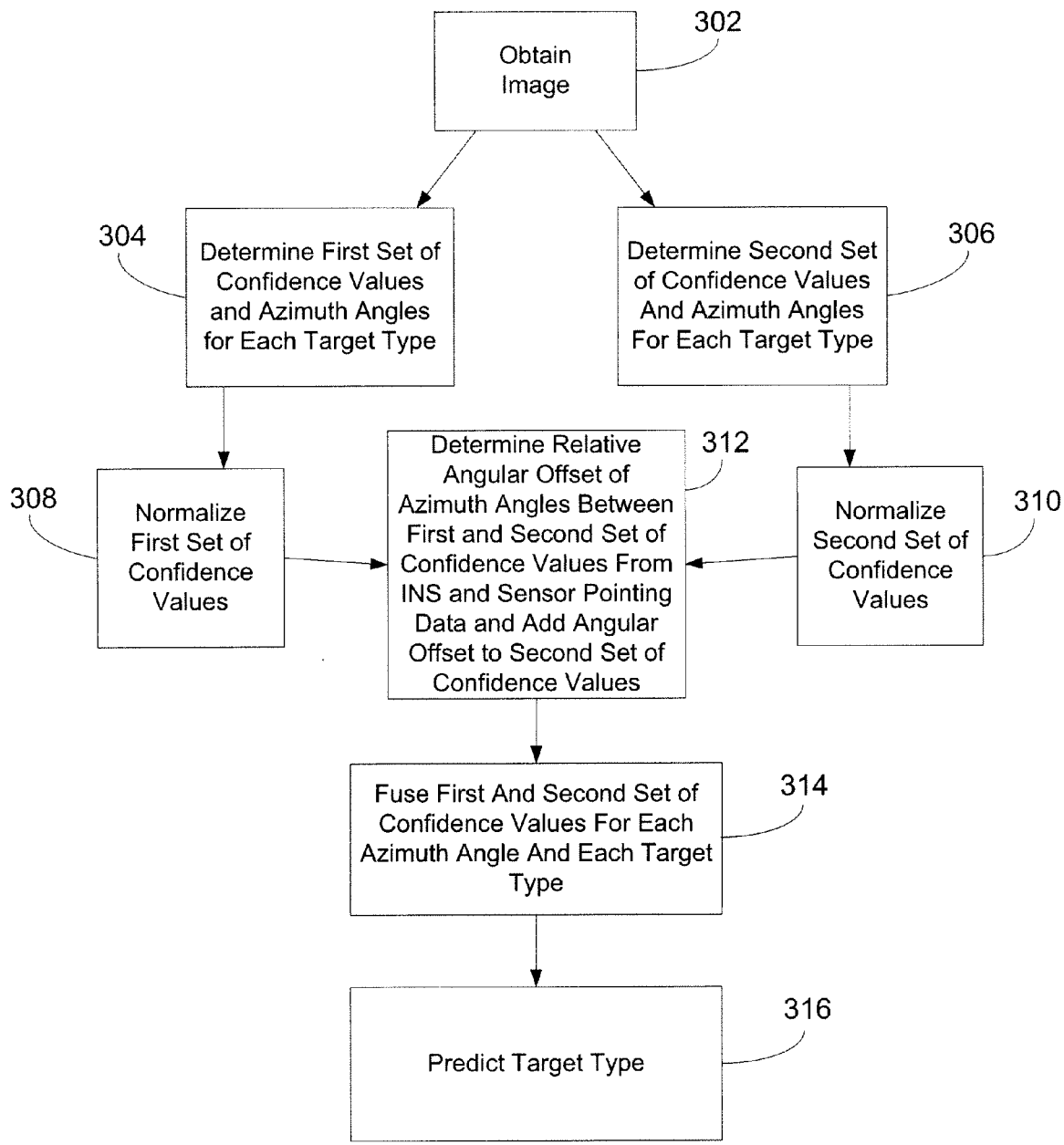
FIG. 3 is a flow diagram illustrating a method for predicting a target type in a set of target types from a single image in accordance with an embodiment of the present invention.
Figure 4:
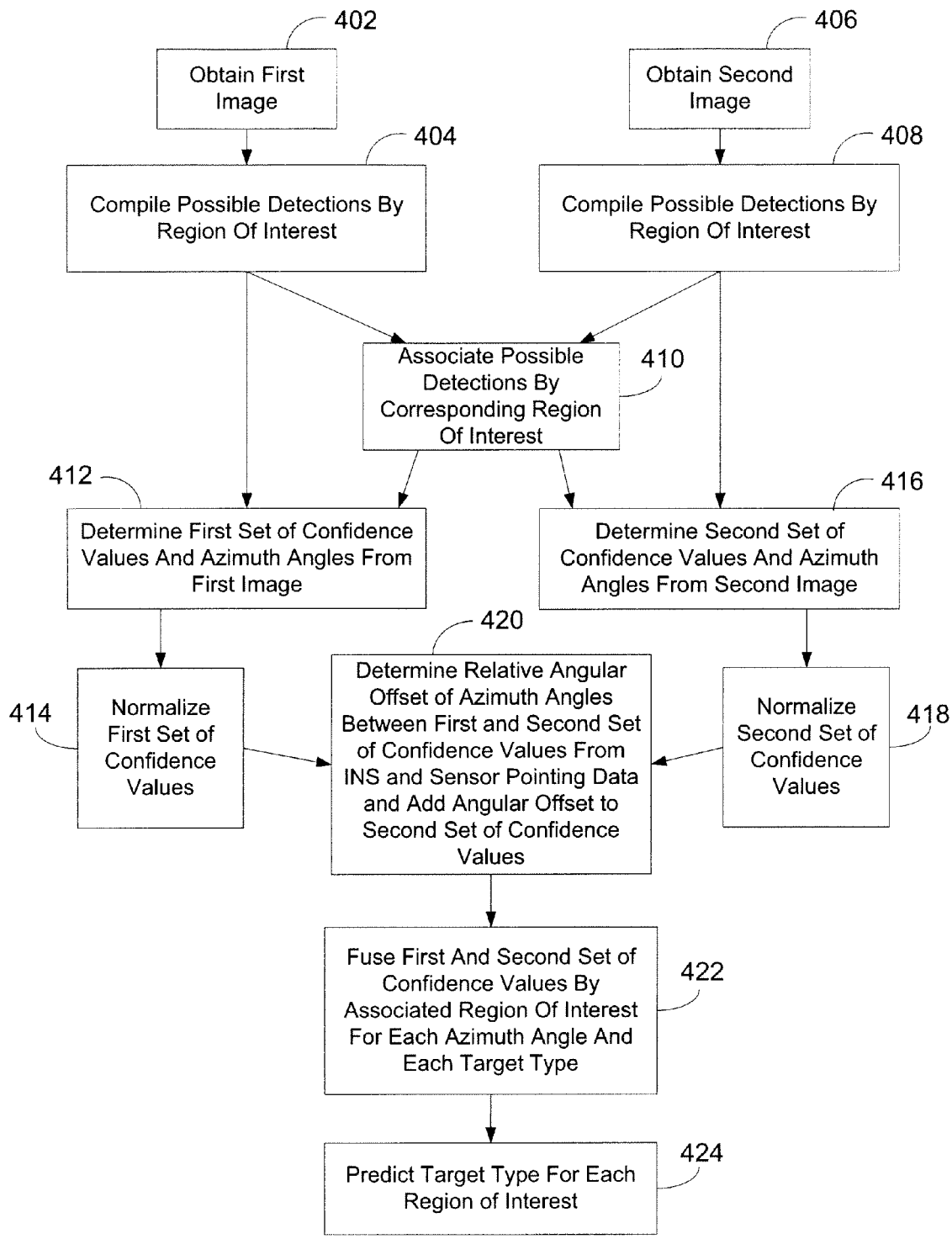
FIG. 4 is a flow diagram illustrating a method for predicting a target type in a set of target types from multiple images in accordance with an embodiment of the present invention.

Referring still to the first ATR processor 104 and the second ATR processor 106, in an embodiment, the first ATR processor 104 and the second ATR processor 106 are configured to perform all or part of the functionality inherent in FIG. 3 and/or FIG. 4. Accordingly, a single sensor may obtain a single image (as in FIG. 3) to be processed by the first ATR processor 104 and the second ATR processor 106. Additionally, a single sensor may obtain multiple images (as in FIG. 4) to be processed by the first ATR processor 104 and the second ATR processor 106. In yet another embodiment, the single image or multiple images may be processed by more than two ATR processors each utilizing different ATR models. Therefore, one of ordinary skill in the art would recognize that the system illustrated in FIG. 1 is not limited to two ATR processors, but may include more than two ATR processors.

Referring still to the first ATR processor 104 and the second ATR processor 106 of FIG. 1, the ATR processors 104, 106, for example, generate ATR scores having fine-grained results. Fine-grained is defined as a maximum of 1-degree increments in pose angles for the ATR results over 360 degrees. This mandates at least 360 scores for each target type.

The INS and sensor pointing data 110 is depicted in FIG. 1 as being provided to the fusion processor 108 from the sensor 102. In other embodiments, the INS data may be supplied directly from an external source, such as an onboard aircraft navigation system. The INS and sensor pointing data 110 comprises absolute locations of the sensor and absolute look angles of the sensor line of sight.

The fusion processor 108 is configured to receive multiple ATR scores from at least two ATR processors and to fuse ATR scores for each consistent relative pose. In an embodiment, the fusion processor 108 is configured to perform at least part of the functionality inherent in FIG. 3 and/or FIG. 4. In other embodiments, the multiple ATR scores are received from a single ATR processor. In this embodiment, the single ATR processor generates at least two sets of ATR scores utilizing different ATR models.

Referring still to the fusion processor 108 in FIG. 1, the fusion processor 108 processes the fine-grained data from the ATR processors 104, 106 to obtain the prediction 112. In one embodiment, the fine-grained data comprises a maximum of 1-degree increments in pose angles for the ATR results. In other embodiments, accordingly, the fine-grained data comprises less than 1-degree increments in pose angles for the ATR results. The fine-grained data allows the fusion processor 108 to provide an accurate prediction 112 because confidences that are fused coherently with respect to azimuth (pose) retain more actual information about the true target. The ATR scores resulting from a single image from a single sensor, therefore, are fused for each azimuth angle (e.g., pose) and for each target type in the set of target types. The prediction 112 may be based on at least one of a maximum value of a fused curve (e.g., the fused curve of FIGS. 3 and 4), a maximum area under the fused curve and a maximum area under the fused curve within an azimuth angle window.

In other embodiments, the sensor 102 generates more than one image and relays a first image to the first ATR processor 104 and a second image to the second ATR processor 106. In this scenario, the first ATR processor 104 and/or the second ATR processor 106 and/or the fusion processor 108, either together or independently, associate(s) possible detections by corresponding regions of interest, such as in the method described in FIG. 4. For example, one of ordinary skill in the art would recognize that the association by corresponding regions of interest may be implemented utilizing an algorithm or parts of an algorithm to be executed by one or more of the processors 104, 106, 108. Moreover, one of ordinary skill in the art would understand that the embodiment identified in FIG. 1 is not limited to obtaining only two images, but may be configured to obtain more than two images. Therefore, the ATR scores resulting from the multiple images are fused based on associated regions of interest for each azimuth angle (e.g., pose) and for each target type in the set of target types.

Figure 2:
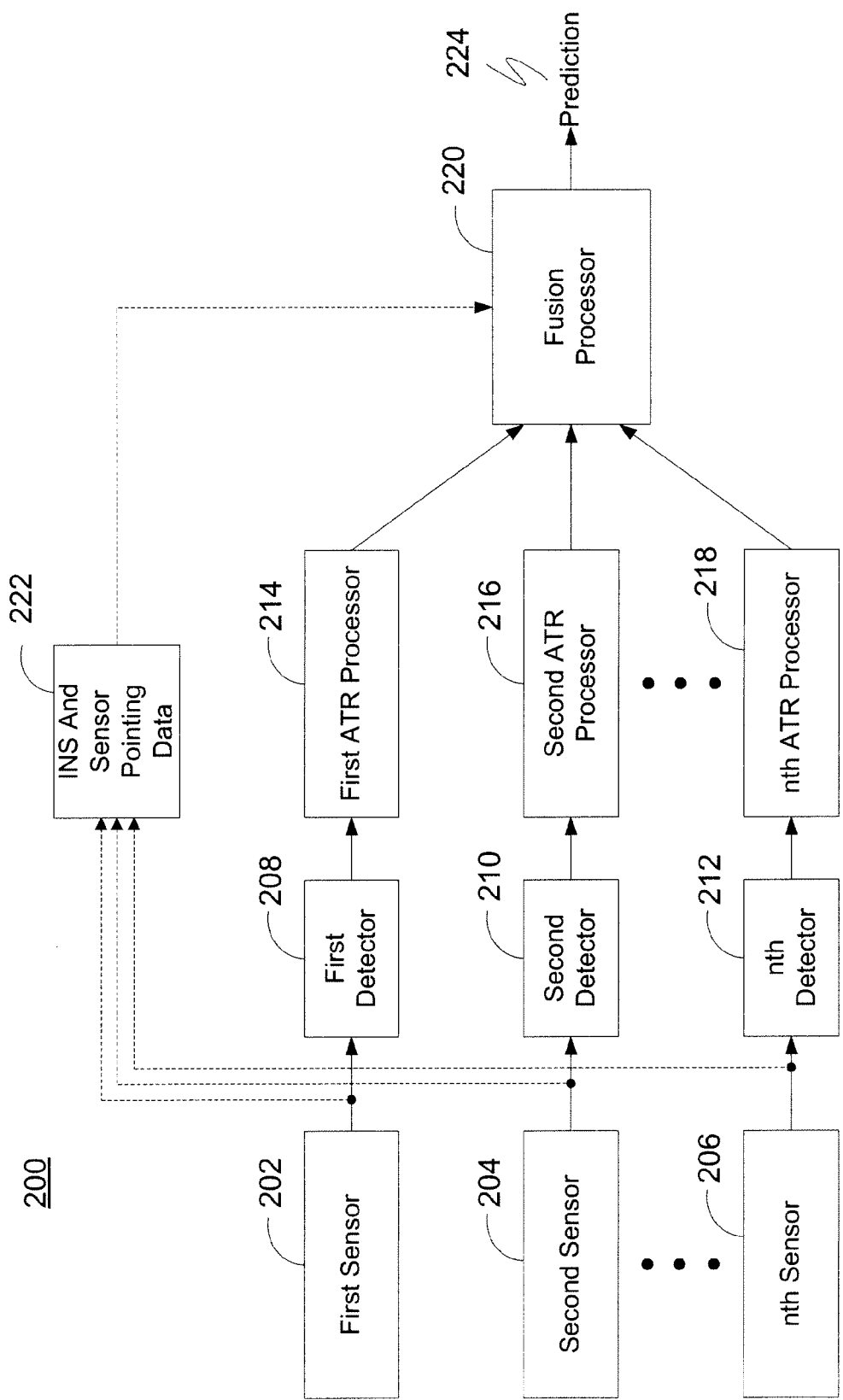
FIG. 2 is a block diagram illustrating an automatic target recognition fusion system utilizing multiple sensors in accordance with an embodiment of the present invention.

FIG. 2 is a block diagram illustrating an ATR fusion system utilizing multiple sensors in accordance with an embodiment of the present invention.

Referring now to FIG. 2, an ATR system 200 includes a first sensor 202, a second sensor 204, an "nth" sensor 206, a first detector 208, a second detector 210, an "nth" detector 212, a first ATR processor 214, a second ATR processor 216, a third ATR processor 218 and a fusion processor 220. Also depicted in FIG. 2 is INS and sensor pointing data 222 and a prediction 224 (e.g., the predictive output of the ATR system 200).

The first sensor 202, the second sensor 204 and the "nth" sensor 206 are configured to receive radiation from a scene and relay optically processed radiation in the form of signals to their respective ATR processors 214, 216, 218. One of ordinary skill in the art would recognize that the sensors 202, 204, 206 may be of various types, designed with specific materials and components based on the system's requirements. In an embodiment, the materials and components of the sensors 202, 204, 206 may be sensitive to the infrared band of the spectrum, but are not necessarily limited thereto. In other embodiments, the sensors 202, 204, 206 are sensitive to the visible spectrum, or any other band suitable to receive sensor information. By way of example, the sensor types comprise Radar, IR, FLIR, LADAR, and others.

The first detector 208, the second detector 210 and the "nth" detector 212 are each configured to detect and/or scan the images received from the respective sensors 202, 204, 206 and determine regions of interest corresponding to the sets of confidence values and associated azimuth angles for each of the target types. The ATR processors 214, 216, 218 and the fusion processor 220 utilize the regions of interest to constrain the fusion of the multiple ATR scores such that consistent ATR scores are fused.

The first ATR processor 214, the second ATR processor 216 and the "nth" ATR processor 218 are each configured to process and generate ATR scores based on various ATR models implemented in the processors and other components of the ATR system 200. The article by L. M. Novak, G. J. Owirka & W. S. Brower, entitled "An Efficient Multi-Target SAR ATR Algorithm," Conference Record of the Thirty-Second Asilomar Conference on Signals, Systems and Computers (1988, pp. 3-13, Vol. 1, Institute of Electrical and Electronics Engineers), hereby incorporated by reference in its entirety, describes examples of ATR models that may be utilized in the ATR system 200. For example, the first ATR processor 214 may implement a different ATR model than the second ATR processor 216 and/or the "nth" ATR processor 218 such that the fusion of the ATR scores from the ATR processors 214, 216, 218 provides fused scores with greater constraints. In an aspect, the different ATR models are implemented in a single ATR processor and output distinct ATR scores based on the different ATR models. In an aspect, the first ATR processor 214, the second ATR processor 216 and the "nth" ATR processor 218 utilize the same ATR model. In the above examples, the ATR processors may utilize same or different ATR models so long as the sensors associated with each of the ATR processors are either at different sensor locations and views or the sensors are of different types.

Referring still to the first first ATR processor 214, the second ATR processor 216 and the "nth" ATR processor 218, in an embodiment, the first ATR processor 214, the second ATR processor 216 and the "nth" ATR processor 218 are configured to perform at least part of the functionality inherent in FIG. 4. Accordingly, multiple sensors may each obtain a single image or multiple images to be processed by the first ATR processor 214, the second ATR processor 216 and the "nth" ATR processor 218. In an embodiment, the multiple images may be processed by more than two ATR processors each utilizing different ATR models.

Referring still to the first ATR processor 214, the second ATR processor 216 and the "nth" ATR processor 218 of FIG. 1, the ATR processors 214, 216, 218, for example, generate ATR scores having fine-grained results. Fine-grained is defined as a maximum of 1-degree increments in azimuth pose angles for the ATR results over 360 degrees. This mandates at least 360 scores for each target type.

The INS and sensor pointing data 222 is depicted in FIG. 2 as being directly provided to the fusion processor 220. In other embodiments, the INS and sensor pointing data 222 may be supplied via the sensors 202, 204, 206. The INS and sensor pointing data 222 comprises absolute locations of the sensor and absolute look angles of the sensor line of sight.

The fusion processor 220 is configured to receive multiple ATR scores from at least two ATR processors ("n" ATR processors shown) and to fuse ATR scores for each consistent relative pose. In an embodiment, the fusion processor 220 is configured to perform at least part of the functionality inherent in FIG. 4. In this embodiment, the "n" ATR processors 214, 216, 218 generate at least two sets of ATR scores utilizing different ATR models. In an aspect, the "n" ATR processors 214, 216, 218 generate at least two sets of ATR scores utilizing the same ATR model.

In an embodiment, the sensors 202, 204, 206 generate more than one image and relay a first image to the first ATR processor 214, a second image to the second ATR processor 216 and an "nth" image to the "nth" ATR processor 218. These images are fused in the fusion processor 220 by corresponding regions of interest determined in the detectors 208, 210, 212. In other embodiments, the first ATR processor 214 and/or the second ATR processor 216 and/or the "nth" ATR processor 218 and/or the fusion processor 220, either together or independently, associate possible detections by corresponding regions of interest, such as in the method associated with FIG. 4. For example, one of ordinary skill in the art would recognize that the association by corresponding regions of interest may be implemented utilizing an algorithm or parts of an algorithm to be executed by one or more of the processors 104, 106, 108. Moreover, one of ordinary skill in the art would understand that the embodiment identified in FIG. 2 is not limited to only obtaining two images, but may be configured to obtain more than two images. Therefore, the ATR scores resulting from the multiple images are fused based on associated regions of interest for each azimuth angle (e.g., pose) and for each target type in the set of target types.

Referring still to the fusion processor 220 in FIG. 1, the fusion processor 220 processes the fine-grained data from the ATR processors 214, 216, 218 to obtain the prediction 224. The fine-grained data comprises a maximum of 1-degree increments in pose angles for the ATR results, resulting in at least 360 scores. The fine-grained data allows the fusion processor 108 to provide an accurate prediction 224 because confidences that are fused coherently with respect to azimuth (pose) retain more actual information about the true target. Moreover, the association of possible detections provides relative constraints on the fused set of ATR scores, providing greater predictivity than prior systems in various situations. The prediction 224 may be based on at least one of a maximum value of a fused curve (e.g., the fused curve of FIGS. 3 and 4), a maximum area under the fused curve and a maximum area under the fused curve within an azimuth angle window.

FIG. 3 is a flow diagram illustrating a method for predicting a target type in a set of target types from a single image in accordance with an embodiment of the present invention.

Referring now to FIG. 3, at Block 302, an image is obtained. For example, the image is obtained from the sensor 102 depicted in FIG. 1. However, the image may be obtained from a variety of sensors configured to obtain imagery. For example, the sensors comprise Radar, IR, FLIR, LADAR, and others.

At Block 304, a first set of confidence values and associated azimuth angles are determined for each target type in a set of target types. For example, the set of target types includes vehicles, including aircraft, ships, boats, trucks, cars, tanks, buildings, military ground targets, and others. The confidence values corresponding to each target type identify an estimate of the type of target for each of the pose angles (e.g., 360 estimates or scores, each corresponding to a different pose angle). Therefore, 360 scores may be determined, one for each of the pose angle degrees and for each target type, corresponding to the potential orientation of a target. One of ordinary skill in the art would understand that more than 360 scores may be determined for each target type.

At Block 306, a second set of confidence values and associated azimuth angles are determined for each target type in the set of target types. As with Block 304, for example, the set of target types includes vehicles, including aircraft, ships, boats, trucks, cars, tanks, buildings, military ground targets, and others. The confidence values corresponding to each target type identify an estimate of the type of target for each of the pose angles (e.g., 360 estimates or scores, each corresponding to a different pose angle). Therefore, 360 scores are determined, one for each of the pose angle degrees and for each target type, corresponding to the potential orientation of a target.

At Block 308, the first set of confidence values are normalized. At Block 310, the second set of confidence scores are normalized. Each ATR model provides presumably different ATR scores on different scales. Accordingly, it is necessary to put each of the set of ATR scores on the same scale (e.g., normalization). For example, the first set of confidence values is normalized by subtracting the ATR scores mean value, dividing by the ATR scores standard deviation and adding an offset to eliminate any negative results, and the second set of confidence values is normalized by subtracting the ATR scores mean value, dividing by the ATR scores standard deviation and adding an offset to eliminate any negative results. The ATR scores mean value and standard deviation may be obtained either in the field (e.g., real data) or by model (e.g., training data).

At Block 312, a relative angular offset of azimuth angles between the first set of confidence values and the second set of confidence values is determined and the angular offset is added to the second set of confidence values. The addition aligns the confidence values such that fusion of the confidence values is based on corresponding azimuth angles.

At Block 314, the first set of confidence values and the second set of confidence values are fused corresponding to each azimuth angle and each target type. The fusion is accomplished by producing a fused curve for each target type in the set of target types. Each point in the fused curve is derived from the first set of normalized confidence values and the second set of normalized confidence values. In an embodiment, each point in the fused curve is a product of one of the first set of confidence values and a corresponding one of the second set of confidence values for each azimuth angle. In other words, consistent confidence values based on azimuth angle (e.g., pose or pose angle) are fused together from the first set of confidence values and the second set of confidence values. The fused curve, therefore, consists of 360 points each of which is a product of one of the first set of confidence values and a corresponding one of the second set of confidence values according to a unique azimuth angle. In another embodiment, the fused curve may consist of 360 points each of which is a sum of one of the first set of confidence values and a corresponding one of the second set of confidence values according to a unique azimuth angle.

At Block 316, the target type is predicted. The prediction may be based on a maximum fused score across all pose angles, a maximum area under the fused curve, a maximum area under a particular azimuth angle window (e.g., over several pose angles), or others. Alternatively, the prediction may be based on a combination of determinations (e.g., more than one of the maximum fused score across all pose angles, the maximum area under the fused curve, the maximum area under a particular azimuth angle window (e.g., over several pose angles), and others). When each of the points of the fused curve consists of a product of two corresponding confidence values, the fused curve when summed is a discrete approximation of a Bayesian integral. When each of the points of the fused curve consists of a sum of two corresponding confidence values, the fused curve when summed is a Bayesian summation. Accordingly, depending on the desired results, the prediction bases identify the best prediction of target type since they are based on the Bayesian integral or summation. For example, the maximum value of the fused curve is essentially associated with the maximum a posteriori estimate of the fusion results (e.g., class, pose angle).

FIG. 4 is a flow diagram illustrating a method for predicting a target type in a set of target types from multiple images in accordance with an embodiment of the present invention.

Referring now to FIG. 4, at Block 402, a first image is obtained. For example, the first image is obtained from the sensor 202 depicted in FIG. 2. However, the image may be obtained from a variety of sensors configured to obtain imagery. For example, the sensors comprise Radar, IR, FLIR, LADAR, and others.

At Block 404, a first set of possible detections are compiled by region of interest. The possible detections are categorized by region of interest (e.g., location in the first image) to later associate the first set of possible detections with possible detections from other images. In other words, multiple images must be registered to each other such that it is possible to unambiguously associate potential target detections in one image or look with the same possible detection location in other additional looks (e.g., corresponding to images). The possible detections in the first image are brought into correspondence with associated detections in the other additional images. Therefore, each region of interest in the first image is brought into correspondence with a region of interest from each of the other additional images.

At Block 406, a second image is obtained. For example, the second image is obtained from the sensor 204 depicted in FIG. 2. However, the image may be obtained from a variety of sensors configured to obtain imagery. For example, the sensors comprise Radar, IR, FLIR, LADAR, and others.

At Block 408, a second set of possible detections are compiled by region of interest. The possible detections are categorized by region of interest (e.g., location in the second image) to later associate the second set of possible detections with possible detections from other images. In other words, multiple images must be registered to each other such that it is possible to unambiguously associate potential target detections in one image or look with the same possible detection location in other additional looks (e.g., corresponding to images). The possible detections in the second image are brought into correspondence with associated detections in the other additional images. Therefore, each region of interest in the second image is brought into correspondence with a region of interest from each of the other additional images.

At Block 410, the first set of possible detections and the second set of possible detections are associated by corresponding regions of interest. The association ensures that the ATR models implemented in the ATR processors (or other implementation of ATR models) determine confidence values and associated azimuth angles in accurate and corresponding areas of the multiple images.

At Block 412, a first set of confidence values and associated azimuth angles is determined from the first image. The determination is performed for each of the regions of interest in the first image. Therefore, a confidence value is determined for each azimuth angle (e.g. pose or pose angle), for each region of interest, and for each target type in the set of target types. The result is a fine-grained set (e.g., at least 360 scores corresponding to the pose angles) of ATR scores for each region of interest and for each target type in the set of target types. For example, the fine-grained set of ATR scores is obtained by running an ATR model on the first image. The ATR model may be implemented in at least one of the processors (e.g., from FIGS. 1 and/or 2) as an ATR algorithm to obtain the fine-grained set of ATR scores. The INS and sensor pointing data 110, 222 from FIGS. 1 and 2 provide a constraint on the ATR results (e.g., the ATR scores) such that each fine-grained set of ATR scores is possible to be brought into correspondence, with respect to pose angles, with each of the other fine grained set of ATR scores. The INS and sensor pointing data 110, 222 provide the information, in terms of sensor coordinate systems, that allow the relative offset information to be calculated, thereby allowing alignment between the ATR confidences as a function of pose angle.

At Block 414, the first set of confidence values is normalized. Each ATR model provides presumably different ATR scores on different scales. Accordingly, it is necessary to put each of the set of ATR scores on the same scale. For example, the first set of confidence values is normalized by subtracting the ATR scores mean value, dividing by the ATR scores standard deviation and adding an offset to eliminate any negative results. The ATR scores mean value may be obtained either in the field (e.g., real data) or by model (e.g., training data).

At Block 416, a second set of confidence values and associated azimuth angles is determined from the second image. The determination is performed for each of the regions of interest in the second image. Therefore, a confidence value is determined for each azimuth angle (e.g. pose or pose angle), for each region of interest, and for each target type in the set of target types. For example, the fine-grained set of ATR scores is obtained by running an ATR model on the second image. The ATR model may be implemented in at least one of the processors (e.g., from FIGS. 1 and/or 2) as an ATR algorithm to obtain the fine-grained set of ATR scores. The INS and sensor pointing data 110, 222 from FIGS. 1 and 2 provide a constraint on the ATR results (e.g., the ATR scores) such that each fine-grained set of ATR scores is possible to be brought into correspondence, with respect to pose angles, with each of the other fine grained set of ATR scores. The INS and sensor pointing data 110, 222 provide the information, in terms of sensor coordinate systems, that allow the relative offset information to be calculated, thereby allowing alignment between the ATR confidences as a function of pose angle.

At Block 418, the second set of confidence values is normalized. Each ATR model provides presumably different ATR scores on different scales. Accordingly, it is necessary to put each of the set of ATR scores on the same scale. For example, the second set of confidence values is normalized by subtracting the ATR scores mean value, dividing by the ATR scores standard deviation and adding an offset to eliminate any negative results. The ATR scores mean value may be obtained either in the field (e.g., real data) or by model (e.g., training data).

At Block 420, a relative angular offset of azimuth angles between the first set of confidence values and the second set of confidence values is determined from the INS and sensor pointing data 110, 222 from each sensor and the angular offset is added to the second set of confidence values. The addition aligns the confidence values such that fusion of the confidence values is based on corresponding azimuth angles.

At Block 422, the first set of confidence values and the second set of confidence values are fused according to associated regions of interest, for each azimuth angle and for each target type in the set of target types. The confidence values have been normalized such that potentially relative scales (in the case of multiple ATR models) are brought into agreement. Each point in the fused curve is derived from the first set of confidence values and the second set of confidence values. In an embodiment, the resulting fused curve consists of at least 360 points, each of the points being a product (or in another embodiment, a sum) of one of the first set of confidence values and a corresponding one of the second set of confidence values. The fused curve itself, therefore, when summed is either a discrete approximation of a Bayesian integral (e.g., if the points are a product) or when summed, is a Bayesian summation (e.g., if the points are a sum).

At Block 424, the target type in the set of target types is predicted. The prediction may be based on a maximum fused score across all pose angles, a maximum area under the fused curve, a maximum area under a particular azimuth angle window (e.g., over several pose angles), or others. Alternatively, the prediction may be based on a combination of determinations (e.g., more than one of the maximum fused score across all pose angles, the maximum area under the fused curve, the maximum area under a particular azimuth angle window (e.g., over several pose angles), and others). Accordingly, the prediction is based on mathematically consistent data from multiple images (e.g., multiple looks and/or multiple sensors) and compiles coherent evidence from the ATR scores. For example, the maximum value of the fused curve is essentially the maximum aposteriori estimate of the fusion results (e.g., class, pose angle).

Referring still to FIG. 4, upon receiving multiple images (e.g., multiple looks or multiple sensors), relative INS data and/or other sensor data (e.g., sensor pointing angle data) is required to align the poses between the multiple images. For example, a relative angular offset is determined and the angular offset is added to the out-of-alignment confidence values. In dual-ATR and/or multi-sensor or multi-look systems, therefore, an angular offset may be added to either the azimuth angles associated with the first set of confidence values or the azimuth angles associated with the second set of confidence values. Absolute mathematical consistency in pose estimates is presumably impossible because real systems have inherent uncertainty in INS data and ATR modeling. However, the ATR scores brought into alignment with respect to pose angle provides close mathematical consistency up to that which is feasible given the particular INS and sensor pointing data measurement accuracy. Accordingly, the actual pose of the object being imaged is not required while fine pose alignment over multiple ATRs and for multiple looks is enforced, thereby improving average results.

Referring now to FIGS. 1-4, when the prediction is based on a maximum area under a particular azimuth angle window (e.g., within an azimuth angle window), the azimuth angle window may be further determined by various criteria. When the target characteristics meet a first set of criteria, the maximum value of the fused curve across potential target types is used to determine the target type (i.e., window is very small); when the target characteristics meet a second set of criteria, the maximum area under the fused curve across potential target types is used to determine target type (i.e., window extends across all azimuth angles); and when the target characteristics meet a third set of criteria, the maximum area for a particular window under the fused curve across potential target types is used to determine target type. For example, assume that there are two potential target types $T_1$ and $T_2$, and that the fused curve for $T_1$ has a maximum value of $M_1$ at $\theta_1$, the fused curve for $T_2$ has a maximum value of $M_2$ at $\theta_2$, the area under the fused curve for $T_1$ is $A_1$, the area under the fused curve for $T_2$ is $A_2$, $M_1 > M_2$, but that $A_2 > A_1$. Assume also that the areas under the fused curve for $T_1$ for window W (e.g., an azimuth angle of 60°) are $A_{11}, A_{12}, \ldots, A_{16}$ with a maximum of $A_{13}$; and that the area under the fused curve $T_2$ for window W is $A_{21}, A_{22}, \ldots, A_{26}$ with a maximum of $A_{24}$. Assume also that $A_{13} > A_{24}$. If the target characteristic meet target criteria A, T1 is predicted because $M_1 > M_2$. If the target characteristics meet target criteria B, $T_2$ is predicted because $A_2 > A_1$. If the target characteristics meet target criteria C, $T_1$, is predicted because $A_{13} > A_{24}$.

In an embodiment of the present invention, the target characteristic is the symmetry of the target. Symmetric targets are more likely to have a flatter fused curve without a maximum, as the confidence values will be spread across the spectrum of azimuth angles. Thus, in an exemplary embodiment of the present invention, the method of determining the target type is a function of the symmetry of the target, with the symmetry determining whether the target type is determined from a maximum of the fused curve, a maximum area under the fused curve over all azimuth angles, or a maximum area under the fused curve for a window of azimuth angles. In other embodiments, the target characteristic is asymmetry or semi-symmetry and semi-asymmetry combined. In yet other embodiments, external information such as that available from modern tracking systems provide the critera by which to determine the basis for the prediction and the window of azimuth angles by which to measure area.

Figure 5:
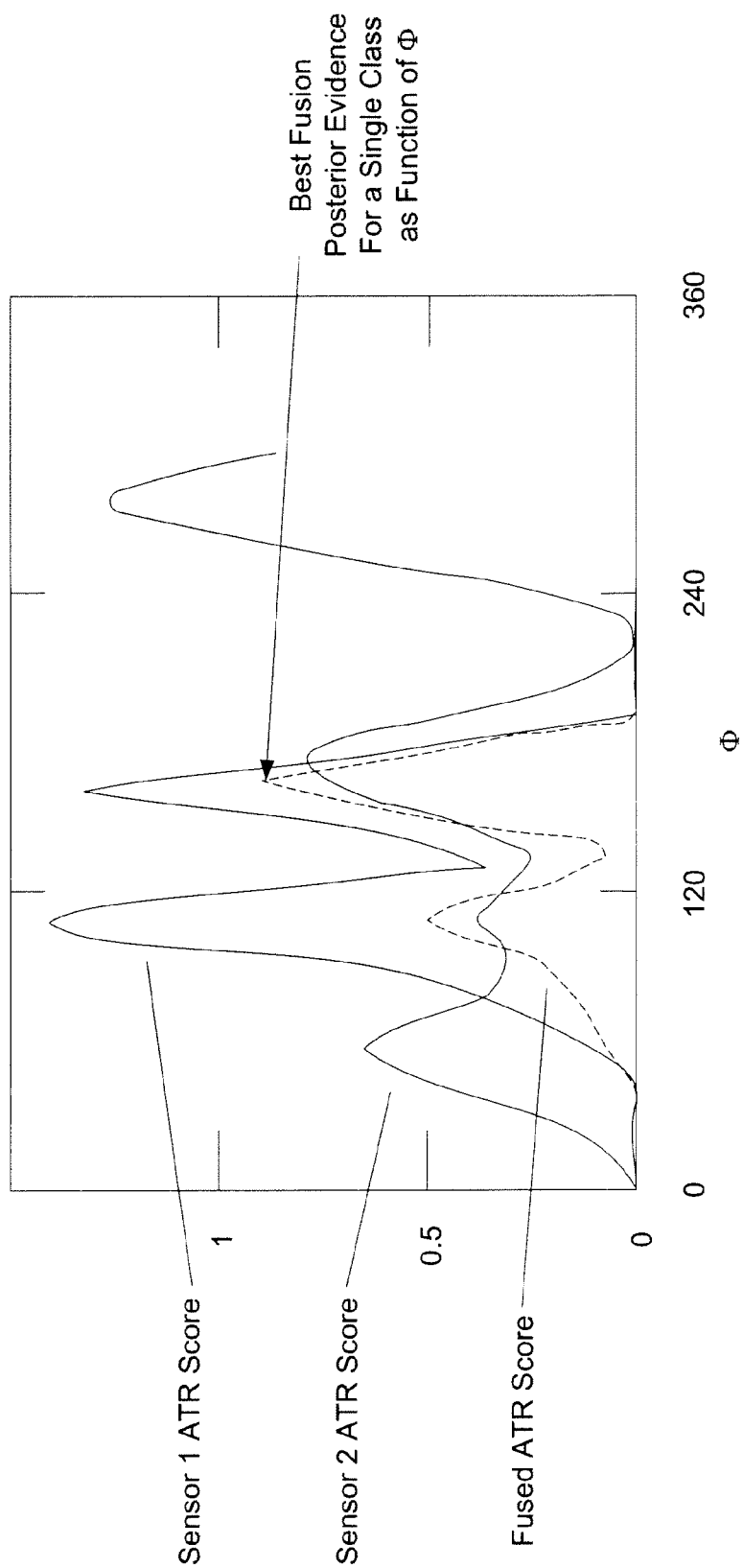
FIG. 5 is a graph depicting possible automatic target recognition scores as a function of pose angle in accordance with an embodiment of the present invention.

FIG. 5 is a graph depicting possible automatic target recognition scores as a function of pose angle in accordance with an embodiment of the present invention.

Referring now to FIG. 5, the graph identifies a Sensor 1 ATR Score, a Sensor 2 ATR Score and a Fused ATR Score, all as a function of pose parameter (e.g., pose angle $\Phi$). These results identify the best fusion posterior evidence for a single class (e.g., single target type) as a function of $\Phi$. For example, FIG. 5 identifies the Sensor 1 ATR Score, the Sensor 2 ATR Score and the Fused ATR Score over 360 degrees of pose angle $\Phi$. The Sensor 1 ATR Score peaks at approximately 100 degrees and 155 degrees. The Sensor 2 ATR Score peaks at approximately 50 degrees and 170 degrees. The Fused ATR Score, which is the product of the Sensor 1 ATR Score and the Sensor 2 ATR Score, peaks at approximately 160 degrees, for a maximum ATR score of approximately 0.9. According to an embodiment, the ATR scores for all of the other potential target types (e.g., classes) would be calculated and fused in an identical manner. The fusion processor may be configured to predict the target type based on several criteria, including the maximum fused ATR score for all target types and azimuth angles, the maximum area under the fused curve, the maximum fused area under the fused curve for a specified azimuth angle range (e.g., range of $\Phi$), or other various criteria. The best fusion posterior evidence identifies a specific target type, thereby generating a prediction based on the Bayesian fusion method. For example, when the fusion processor is configured to predict the target type based on the maximum fused ATR score, if 0.9 in the target type specified in FIG. 5 is the maximum fused ATR score, the method and system thereof outputs the target type specified in FIG. 5. One of ordinary skill in the art would understand that the prediction is reliant on the system requirements and overall desired results based on the system's applications.

Referring now to FIGS. 1-5, uncertainty is expected in the estimates of each of the pose parameters (e.g., position, orientation) from systems such as onboard INS. A second level of integration may be imposed over the density function (e.g., Gaussian with standard deviation of 10 degrees) or uncertainty interval (e.g., plus or minus 10 degrees) from the INS. The resulting weighting function may be applied to the estimates of the pose parameters to weight and interpolate the hypothesis evidence for each sensor. Since the INS systems from sensors A and B may differ, the system allows tuning and optimization to this uncertainty.

Referring still to FIGS. 1-5, in an embodiment, all of the various processors described may be implemented together or independently on a single chip. In other embodiments, all of the processors may be integrated with other components in the system herein.

Therefore, there is presented a method and system of fusion for ATR. The method and system thereof reduces ambiguity of ATR hypotheses when performing fusion by utilizing information from sensor(s) to provide a constraint on relative orientations. Significant improvement of ATR fusion results is achieved from the reduced ambiguity. The method may be implemented in single sensor, multiple ATR systems, multiple sensor, single look systems, and single sensor, multiple look systems, and multiple sensor, multiple look systems.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method of predicting a target type in a set of target types from multiple images, comprising:
   obtaining first and second images;
   compiling a first set of possible detections corresponding to regions of interest within the first image and a second set of possible detections corresponding to regions of interest within the second image;
   associating each of the regions of interest from the first set of possible detections with a corresponding one of the regions of interest from the second set of possible detections;
   determining a first set of confidence values and associated azimuth angles for each target type in the set of target types from the first image;
   determining a second set of confidence values and associated azimuth angles for each target type in the set of target types from the second image;
   fusing the first set of confidence values and the second set of confidence values in accordance with the associated regions of interest for each of the azimuth angles to produce a fused curve for each target type in the set of target types, each point in the fused curve being derived from one of the first set of confidence values and a corresponding one of the second set of confidence values for each azimuth angle; and
   predicting the target type from the set of target types based on at least one of a maximum value of the fused curve, a maximum area under the fused curve and a maximum area under the fused curve within an azimuth angle window.

2. The method of claim 1, the method further comprising:
   normalizing each of the first set of confidence values by subtracting a mean value of the first set of confidence values from each of the first set of confidence values and dividing the result by a standard deviation of the first set of confidence values; and
   normalizing each of the second set of confidence values by subtracting a mean value of the second set of confidence values from each of the second set of confidence values and dividing the result by a standard deviation of the second set of confidence values.

3. The method of claim 1, the method further comprising:
   aligning the first set of confidence values with the second set of confidence values for each target type in the set of target types by adding an angular offset to each of the azimuth angles associated with the second set of confidence values in proportion to a relative offset between the azimuth angles associated with the first set of confidence values and the azimuth angles associated with the second set of confidence values.

4. The method of claim 3, wherein the target type is further predicted by:
   determining an area under the fused curve for each of a number of azimuth angle windows and for each target type in the set of target types;
   determining a maximum area under the fused curve from among the areas corresponding to each of the azimuth angle windows for each target type in the set of target types; and
   comparing each of the maximum areas to determine an absolute maximum area, the target type with the absolute maximum area being the predicted target type.

5. The method of claim 1, wherein the first image and the second image are obtained from a first sensor.

6. The method of claim 3, wherein the first image is obtained from the first sensor and the second image is obtained from a second sensor.

7. The method of claim 1, wherein the azimuth angle window is 360°.

8. The method of claim 1, wherein the azimuth angle window is less than or equal to 1°.

9. The method of claim 1, wherein the azimuth angle window is greater than 1° and less than 360°.

10. The method of claim 1, wherein when the target has a first characteristic, the azimuth angle window is less than or equal to 120; when the target has a second characteristic, the azimuth angle window is 360°; and when the target has a third characteristic, the azimuth angle window is greater than 1° and less than 360°.

11. The method of claim 10, wherein the first characteristic is asymmetry, the second characteristic is symmetry, and the third characteristic is semi-symmetry and semi-asymmetry.

12. The method of claim 1, wherein the fused curve is a summation of the first set of confidence values and the second set of confidence values.

13. The method of claim 1, wherein the fused curve is a product of the first set of confidence values and the second set of confidence values.

14. The method of claim 1, further comprising:
   estimating uncertainty in the first set of confidence values and associated azimuth angles and applying a density function of the estimated uncertainty to generate a weighting function;
   weighting the first set of confidence values and associated azimuth angles in accordance with the weighting function;
   estimating uncertainty in the second set of confidence values and associated azimuth angles and applying a density function of the estimated uncertainty to generate a weighting function; and
   weighting the second set of confidence values and associated azimuth angles in accordance with the weighting function.

15. A method of predicting a target type in a set of target types from an image, the method comprising:
   obtaining the image;
   determining a first set of confidence values and associated azimuth angles for each target type in the set of target types from the image;
   determining a second set of confidence values and associated azimuth angles for each target type in the set of target types from the image;

fusing the first set of confidence values and the second set of confidence values for each of the azimuth angles to produce a fused curve for each target type in the set of target types, each point in the fused curve being derived from one of the first set of confidence values and a corresponding one of the second set of confidence values for each azimuth angle; and predicting the target type from the set of target types based on at least one of a maximum value of the fused curve, a maximum area under the fused curve, and a maximum area under the fused curve within an azimuth angle window.

16. The method of claim 15, wherein the target type is further predicted by:
   determining an area under the fused curve for each of the azimuth angle windows and for each target type in the set of target types;
   determining a maximum area under the fused curve from among the areas corresponding to each of the azimuth angle windows for each target type in the set of target types; and
   comparing each of the maximum areas to determine an absolute maximum area, the target type with the absolute maximum area being the predicted target type.

17. The method of claim 15, wherein the azimuth angle window is 360°.

18. The method of claim 15, wherein the azimuth angle window is less than or equal to 1°.

19. The method of claim 15, wherein the azimuth angle window is greater than 1° and less than 360°.

20. The method of claim 15, wherein when the target has a first characteristic, the azimuth angle window is less than or equal to 1°; when the target has a second characteristic, the azimuth angle window is 360°; and when the target has a third characteristic, the azimuth angle window is greater than 1° and less than 360°.

21. The method of claim 20, wherein the first characteristic is asymmetry, the second characteristic is symmetry, and the third characteristic is semi-symmetry and semi-asymmetry.

22. The method of claim 15, wherein the fused curve is a summation of the first set of confidence values and the second set of confidence values.

23. The method of claim 15, wherein the fused curve is a product of the first set of confidence values and the second set of confidence values.

24. An automatic target recognition fusion system comprising:
   at least one sensor configured to obtain images of a scene;
   at least one fusion processor configured to compile a first set of possible detections corresponding to regions of interest within a first image, compile a second set of possible detections corresponding to regions of interest within a second image, and associate each one of the regions of interest from the first set of possible detections with a corresponding one of the regions of interest from the second set of possible detections; and
   at least one automatic target recognition processor configured to determine a first set of confidence values and associated azimuth angles for each target type in a set of target types from the first image and determine a second set of confidence values and associated azimuth angles for each target type in the set of target types from the second image,
   wherein the fusion processor is further configured to fuse the first set of confidence values and the second set of confidence values in accordance with the associated regions of interest for each of the azimuth angles to produce a fused curve for each target type in the set of target types, each point in the fused curve being derived from one of the first set of confidence values and a corresponding one of the second set of confidence values for each azimuth angle, and predict the target type from the set of target types based on at least one of a maximum value of the fused curve, a maximum area under the fused curve and a maximum area under the fused curve within an azimuth angle window.

25. The automatic target recognition fusion system of claim 24, wherein the fusion processor is further configured to normalize each of the first set of confidence values by subtracting a mean value of the first set of confidence values from each of the first set of confidence values and dividing the result by a standard deviation of the first set of confidence values, and normalize each of the second set of confidence values by subtracting a mean value of the second set of confidence values from each of the second set of confidence values and dividing the result by a standard deviation of the second set of confidence values.

26. The automatic target recognition fusion system of claim 24, wherein the fusion processor is further configured to align the first set of confidence values with the second set of confidence values for each target type in the set of target types by adding an angular offset to each of the azimuth angles associated with the second set of confidence values in proportion to a relative offset within the azimuth angles associated with the first set of confidence values and the azimuth angles associated with the second set of confidence values.

* * * * *